Oct. 30, 1956  P. E. CLINGMAN  2,768,411
SEALING STRIPS
Filed Dec. 5, 1952
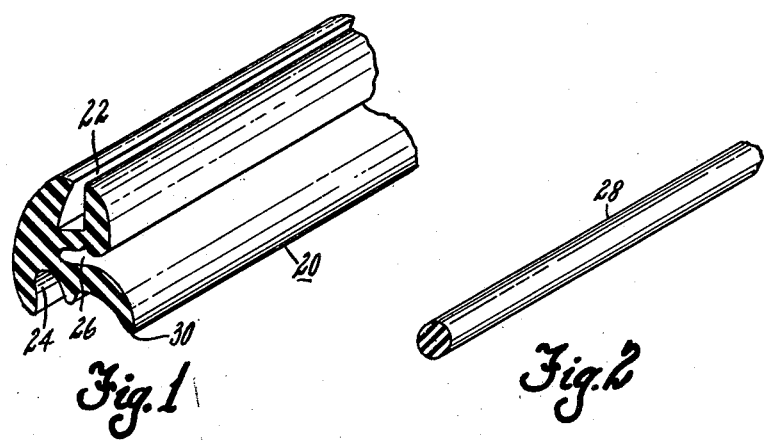
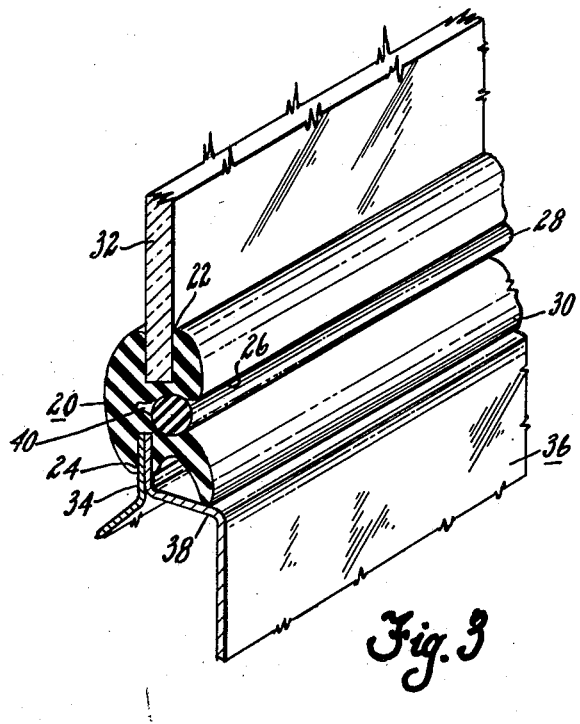
INVENTOR.
PAUL E. CLINGMAN
BY
*Willits Hardman* &c.
HIS ATTORNEYS United States Patent Office 2,768,411
Patented Oct. 30, 1956

2,768,411

SEALING STRIPS

Paul E. Clingman, Dayton, Ohio, assignor to General Motors Corporation, Detroit, Mich., a corporation of Delaware Application December 5, 1952, Serial No. 324,268

1 Claim. (Cl. 20—56.4)

This invention relates to sealing strips and is particularly concerned with sealing strips for sealing glass to rigid panels and the like.

One of the objects of the invention is to provide a sealing strip which carries a garnish molding or finish integrally combined therewith.

In carrying out the above object, it is a further object of the present invention to form a sealing strip which includes a filler strip that provides for positive sealing pressure against the glass and which also functions as a means for causing the garnish molding or finish portion of the strip to be brought into sealing contact with the panel to which the glass is to be attached.

Another object of the invention is to provide a sealing strip having a longitudinally extending elongated lip integrally formed therewith, which lip, upon application of the strip, overlies a portion of a panel to provide a finish molding or garnish.

Further objects and advantages of the present invention will be apparent from the following description, reference being had to the accompanying drawing, wherein preferred embodiments of the present invention are clearly shown.

In the drawing:

Fig. 1 is a fragmentary view in perspective showing a section of the sealing strip as disclosed herein.

Fig. 2 is a view in perspective of a section of the filler strip.

Fig. 3 is a view in perspective showing the sealing strip in Fig. 1 used in connection with an assembly of a glass pane and a portion of a body panel.

Sealing strips are widely used for connecting and sealing glass panes to body panels, for example, the windshield or a back window of an automobile to the body. In this connection it is desirable to have a sealing strip which will pass entirely around the glass and connect it in sealing engagement with the panel or body wherein the glass is held resiliently for preventing chattering thereof due to vibrations, etc., and is sealed against the elements.

Numerous sealing strips have been suggested for this purpose, one of which is clearly shown in Eichner Patent No. 2,189,138 assigned to the assignee here. The strip shown in said Eichner patent has longitudinally extending grooves therein on opposed sides thereof, one of which fits over a pinchweld of the body and the other of which receives the edge of the glass pane. The Eichner strip is unique in that a filler strip is provided which is inserted in the strip after the assembly of the glass and the panel for causing the strip to sealingly engage the glass and the panel for preventing leakage therearound.

The present invention is directed primarily to an Eichner type of strip in that a filler is used and includes the improvement of a garnish molding strip integrally formed with said strip.

In most sealing strip applications, garnish molding is used as a finish for the strip and for presenting an attractive appearance to the application. In some cases, the molding covers the strip and overlies a portion of the body. This garnish molding may be of rubber-like material in strip form or it may be metallic as a chrome plated steel or brass strip. In the present instance, the garnish molding to be described hereinafter is integral with the sealing strip, is elastomeric, and is used primarily to seal off the body and presents a finished appearance along the pinchweld.

Referring specifically to Fig. 1, a strip 20 is shown having a longitudinally extending glass receiving groove 22 at one side thereof and a normally open pinchweld groove 24 at the other side thereof, which groove 24 extends longitudinally of the strip. Intermediate the grooves 22 and 24 and extending longitudinally of the strip is a third groove 26 which is used to receive an interlocking filler strip 28 shown in Fig. 2.

The unique portion of the sealing strip 20 is the garnish moldinng lip portion 30 shown in Fig. 1. This lip 30 extends outwardly a substantial distannce at substantially right angles to the glass receiving groove 22 when the strip is in free form. When the strip is assembled as shown in Fig. 3, a pane of glass 32 is placed within the glass receiving groove 22 while the pinchweld groove 24 is straddled over the pinchweld 34 of the body 36. The body 36 extends outwardly from the pinchweld as at 38 to form a shelf which is engaged by the lip 30. It will be noted that when the filler strip 28 is inserted in the groove 26, it forces the pinchweld groove 24 into tight engagement with the pinchweld 34 and simultaneously causes the lip 30 to be rotated downwardly into tight sealing engagement with the portion 38 of the body and thus form a finish garnish along the strip and body. It will be noted that behind the lip 30 is a cavity 40 due to the formation of the strip which permits free flexing of the lip 30 so that the same is resiliently held tight against the portion 38 of the body. The lip 30 is so dimensioned as to cause a closing action on the groove 26 when the strip is installed, thus improving the seal with the glass when the filler 28 is inserted.

In this structure of the sealing strip, the strip performs the dual function of joining the glass pane to the body in sealing engagement therewith and simultaneously providing a garnish molding as at 30 which hides and seals the pinchweld, thereby giving the assembly a finished appearance. With this structure of a sealing strip it is possible to eliminate the use of additional garnish moldings, such as has been the practice.

It is understood that the sealing strip 20 is formed from any suitable elastomeric material as is well known in the art, it being only necessary that the strip have sufficient resiliency to properly flex upon insertion of the filler strip and to sealingly engage the parts being joined. The filler strip while preferably being formed of rubber-like material may be of any suitable resilient material which can be bent around the corners of the windows, etc. The filler strip is generally and preferably made from the same material as the sealing strip although this is not necessarily the case.

While the embodiments of the present invention as herein disclosed, constitute preferred forms, it is to be understood that other forms might be adopted.

What is claimed is as follows:

A combination sealing strip and garnish molding for use in connecting two panels, one to the other, wherein one panel includes an outwardly extending shoulder of longitudinal extent disposed adjacent the connected portion thereof, the combination comprising; an elastomeric body portion of longitudinal extent including a normally partially closed, longitudinally extending groove therein adapted to receive the unshouldered panel, a pair of lips of substantial thickness and strength extending outwardly and longitudinally from said body portion in opposed flared relation to said groove, a longitudinally outwardly extending ridge on said body portion disposed intermediate said lips and in opposed relation to said groove, a normally closed, longitudinally extending groove in said body portion disposed intermediate said first mentioned groove and one of said lips, and a filler strip adapted to be forced into said normally closed groove for causing one of said lips to rotate toward the other and to engage the shoulder on said panel and for simultaneously causing said ridge to rotate toward said other lip for forming a groove therewith which is adapted to sealingly engage the connecting portion of said shouldered panel while causing said first mentioned groove to sealingly engage the other panel, said shoulder engaging lip having a relatively heavy cross section and bearing against said shoulder for urging closed the filler strip receiving groove whereby the sealing effect thereof is improved said shoulder engaging lip also forming a garnish molding effect.

References Cited in the file of this patent

UNITED STATES PATENTS

| | | |
|---|---|---|
| 2,093,614 | Lynch | Sept. 21, 1937 |
| 2,189,138 | Eichner | Feb. 6, 1940 |
| 2,205,538 | Owen | June 25, 1940 |

FOREIGN PATENTS

| | | |
|---|---|---|
| 630,827 | Great Britain | Oct. 21, 1949 |